US008745078B2

(12) United States Patent
Lee et al.

(10) Patent No.: US 8,745,078 B2
(45) Date of Patent: Jun. 3, 2014

(54) CONTROL COMPUTER AND FILE SEARCH METHOD USING THE SAME

(75) Inventors: Chung-I Lee, New Taipei (TW);
Chien-Fa Yeh, New Taipei (TW);
Chiu-Hua Lu, New Taipei (TW);
Gen-Chi Lu, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 316 days.

(21) Appl. No.: 13/186,480

(22) Filed: Jul. 20, 2011

(65) Prior Publication Data
US 2012/0166434 A1 Jun. 28, 2012

(30) Foreign Application Priority Data
Dec. 24, 2010 (TW) .................................. 99145699 A

(51) Int. Cl.
*G06F 17/30* (2006.01)

(52) U.S. Cl.
USPC ........................... 707/765; 707/766; 707/767

(58) Field of Classification Search
CPC .............. G06F 17/30; G06F 17/30672; G06F 17/30663; G06F 17/3066; G06F 17/30867; G06F 17/30905; G06F 17/30749; G06F 17/30761; G06F 17/30035
USPC ......................................... 707/765, 766, 767
See application file for complete search history.

(56) References Cited

U.S. PATENT DOCUMENTS

| | | | |
|---|---|---|---|
| 8,086,623 B2 * | 12/2011 | Dettinger et al. | 707/766 |
| 8,312,125 B1 * | 11/2012 | Rioux et al. | 709/223 |
| 2002/0152202 A1 * | 10/2002 | Perro et al. | 707/3 |
| 2004/0199498 A1 | 10/2004 | Kapur et al. | |
| 2005/0283473 A1 * | 12/2005 | Rousso et al. | 707/5 |
| 2009/0100022 A1 * | 4/2009 | Nayak et al. | 707/3 |
| 2010/0057811 A1 * | 3/2010 | Dettinger et al. | 707/765 |
| 2010/0094835 A1 | 4/2010 | Lu et al. | |

OTHER PUBLICATIONS

"Why Not Use Query Logs As Corpora?", retrieved from the Internet: URL: http://citeseerx.ist.psu.edu/viewdoc/download.
"SVD and LSI Tutorial 4: Latent Semantic Indexing", pp. 1-15.

* cited by examiner

*Primary Examiner* — Debbie Le
(74) *Attorney, Agent, or Firm* — Novak Druce Connolly Bove + Quigg LLP

(57) ABSTRACT

A method for performing file search using a control computer receives an initial query expression from a client computer, divides the initial query expression into one or more keywords, determines related terms corresponding to each keyword, merges the keywords and the related terms to obtain an updated query expression, and generates search results according to the updated query expression. The method further calculates relevance scores among a plurality of documents in the search results and the updated query expression, ranks the documents in the search results according to the relevance scores, and displays the documents in the search results with the ranked order.

19 Claims, 15 Drawing Sheets

| Document | Title |
|---|---|
| D1 | Network Service Protection With P-cycles: Theory, Design, Operation and Evolution |
| D2 | Network Flow Analysis |
| D3 | Network Nation: Inventing American Telecommunications |
| D4 | Google Apps Deciphered: Compute in the Cloud to Streamline Your Desktop |
| D5 | Philosophy of Quantum Information and Entanglement |
| D6 | Executive's Guide to Cloud Computing |
| D7 | Network Technologies For Network Terrorists: Assessing the Value of Information and Communications Technologies to Modern Terr |

FIG. 5

|  | D1 | D2 | D3 | D4 | D5 | D6 | D7 |
|---|---|---|---|---|---|---|---|
| Network | 1 | 1 | 1 | 0 | 0 | 0 | 2 |
| Service | 1 | 0 | 0 | 0 | 0 | 0 | 0 |
| Protection | 1 | 0 | 0 | 0 | 0 | 0 | 0 |
| P-cycles | 1 | 0 | 0 | 0 | 0 | 0 | 0 |
| Theory | 1 | 0 | 0 | 0 | 0 | 0 | 0 |
| Design | 1 | 0 | 0 | 0 | 0 | 0 | 0 |
| Operation | 1 | 0 | 0 | 0 | 0 | 0 | 0 |
| Evolution | 1 | 0 | 0 | 0 | 0 | 0 | 0 |
| Flow | 0 | 1 | 0 | 0 | 0 | 0 | 0 |
| Analysis | 0 | 1 | 0 | 0 | 0 | 0 | 0 |
| Inventing | 0 | 0 | 1 | 0 | 0 | 0 | 0 |
| American | 0 | 0 | 1 | 0 | 0 | 0 | 0 |
| Telecommunications | 0 | 0 | 1 | 0 | 0 | 0 | 0 |
| Google | 0 | 0 | 0 | 1 | 0 | 0 | 0 |
| Apps | 0 | 0 | 0 | 1 | 0 | 0 | 0 |
| Deciphered | 0 | 0 | 0 | 1 | 0 | 0 | 0 |
| Compute | 0 | 0 | 0 | 1 | 0 | 1 | 0 |
| Cloud | 0 | 0 | 0 | 1 | 0 | 1 | 0 |
| Streamline | 0 | 0 | 0 | 1 | 0 | 0 | 0 |
| Desktop | 0 | 0 | 0 | 1 | 0 | 0 | 0 |
| Philosophy | 0 | 0 | 0 | 0 | 1 | 0 | 0 |
| Quantum | 0 | 0 | 0 | 0 | 1 | 0 | 0 |
| Information | 0 | 0 | 0 | 0 | 1 | 0 | 1 |
| Entanglement | 0 | 0 | 0 | 0 | 1 | 0 | 0 |
| Executive | 0 | 0 | 0 | 0 | 0 | 1 | 0 |
| Guide | 0 | 0 | 0 | 0 | 0 | 1 | 0 |
| Technology | 0 | 0 | 0 | 0 | 0 | 0 | 2 |
| Terrorists | 0 | 0 | 0 | 0 | 0 | 0 | 1 |
| Assessing | 0 | 0 | 0 | 0 | 0 | 0 | 1 |
| Value | 0 | 0 | 0 | 0 | 0 | 0 | 1 |
| Communication | 0 | 0 | 0 | 0 | 0 | 0 | 1 |
| Modern | 0 | 0 | 0 | 0 | 0 | 0 | 0 |
| Terr | 0 | 0 | 0 | 0 | 0 | 0 | 1 |
| Nation | 0 | 0 | 1 | 0 | 0 | 0 | 1 |

FIG. 6

| | | | | | | |
|---|---|---|---|---|---|---|
| 0.61 | 0.00 | 0.19 | 0.22 | 0.03 | 0.00 | 0.29 |
| 0.06 | 0.00 | 0.34 | -0.08 | -0.01 | 0.00 | -0.06 |
| 0.06 | 0.00 | 0.34 | -0.08 | -0.01 | 0.00 | -0.06 |
| 0.06 | 0.00 | 0.34 | -0.08 | -0.01 | 0.00 | -0.06 |
| 0.06 | 0.00 | 0.34 | -0.08 | -0.01 | 0.00 | -0.06 |
| 0.06 | 0.00 | 0.34 | -0.08 | -0.01 | 0.00 | -0.06 |
| 0.06 | 0.00 | 0.34 | -0.08 | -0.01 | 0.00 | -0.06 |
| 0.06 | 0.00 | 0.34 | -0.08 | -0.01 | 0.00 | -0.06 |
| 0.04 | 0.00 | 0.03 | 0.09 | 0.03 | 0.00 | 0.61 |
| 0.04 | 0.00 | 0.03 | 0.09 | 0.03 | 0.00 | 0.61 |
| 0.06 | 0.00 | 0.02 | 0.38 | 0.25 | 0.00 | -0.15 |
| 0.06 | 0.00 | 0.02 | 0.38 | 0.25 | 0.00 | -0.15 |
| 0.06 | 0.00 | 0.02 | 0.38 | 0.25 | 0.00 | -0.15 |
| 0.00 | 0.32 | 0.00 | 0.00 | 0.00 | 0.26 | 0.00 |
| 0.00 | 0.32 | 0.00 | 0.00 | 0.00 | 0.26 | 0.00 |
| 0.00 | 0.32 | 0.00 | 0.00 | 0.00 | 0.26 | 0.00 |
| 0.00 | 0.47 | 0.00 | 0.00 | 0.00 | -0.26 | 0.00 |
| 0.00 | 0.47 | 0.00 | 0.00 | 0.00 | -0.26 | 0.00 |
| 0.00 | 0.32 | 0.00 | 0.00 | 0.00 | 0.26 | 0.00 |
| 0.00 | 0.32 | 0.00 | 0.00 | 0.00 | 0.26 | 0.00 |
| 0.02 | 0.00 | -0.03 | -0.25 | 0.44 | 0.00 | 0.04 |
| 0.02 | 0.00 | -0.03 | -0.25 | 0.44 | 0.00 | 0.04 |
| 0.24 | 0.00 | -0.14 | -0.33 | 0.33 | 0.00 | -0.02 |
| 0.02 | 0.00 | -0.03 | -0.25 | 0.44 | 0.00 | 0.04 |
| 0.00 | 0.16 | 0.00 | 0.00 | 0.00 | -0.52 | 0.00 |
| 0.00 | 0.16 | 0.00 | 0.00 | 0.00 | -0.52 | 0.00 |
| 0.44 | 0.00 | -0.21 | -0.17 | -0.22 | 0.00 | -0.11 |
| 0.22 | 0.00 | -0.11 | -0.09 | -0.11 | 0.00 | -0.05 |
| 0.22 | 0.00 | -0.11 | -0.09 | -0.11 | 0.00 | -0.05 |
| 0.22 | 0.00 | -0.11 | -0.09 | -0.11 | 0.00 | -0.05 |
| 0.22 | 0.00 | -0.11 | -0.09 | -0.11 | 0.00 | -0.05 |
| 0.00 | 0.00 | 0.00 | 0.00 | 0.00 | 0.00 | 0.00 |
| 0.22 | 0.00 | -0.11 | -0.09 | -0.11 | 0.00 | -0.05 |
| 0.29 | 0.00 | -0.08 | 0.30 | 0.14 | 0.00 | -0.21 |

FIG. 7

| 4.11 | 0.00 | 0.00 | 0.00 | 0.00 | 0.00 | 0.00 |
|------|------|------|------|------|------|------|
| 0.00 | 2.83 | 0.00 | 0.00 | 0.00 | 0.00 | 0.00 |
| 0.00 | 0.00 | 2.73 | 0.00 | 0.00 | 0.00 | 0.00 |
| 0.00 | 0.00 | 0.00 | 2.09 | 0.00 | 0.00 | 0.00 |
| 0.00 | 0.00 | 0.00 | 0.00 | 1.94 | 0.00 | 0.00 |
| 0.00 | 0.00 | 0.00 | 0.00 | 0.00 | 1.73 | 0.00 |
| 0.00 | 0.00 | 0.00 | 0.00 | 0.00 | 0.00 | 1.57 |

FIG. 8

| | | | | | | |
|---|---|---|---|---|---|---|
| 0.25 | 0.00 | 0.95 | -0.17 | -0.03 | 0.00 | -0.10 |
| 0.17 | 0.00 | 0.09 | 0.20 | 0.05 | 0.00 | 0.96 |
| 0.27 | 0.00 | 0.06 | 0.80 | 0.48 | 0.00 | -0.24 |
| 0.00 | 0.89 | 0.00 | 0.00 | 0.00 | 0.45 | 0.00 |
| 0.07 | 0.00 | -0.08 | -0.52 | 0.85 | 0.00 | 0.06 |
| 0.00 | 0.45 | 0.00 | 0.00 | 0.00 | -0.89 | 0.00 |
| 0.91 | 0.00 | -0.29 | -0.18 | -0.23 | 0.00 | -0.08 |

FIG. 9

$$U' = \begin{pmatrix} 0.61 & 0.00 \\ 0.06 & 0.00 \\ 0.06 & 0.00 \\ 0.06 & 0.00 \\ 0.06 & 0.00 \\ 0.06 & 0.00 \\ 0.06 & 0.00 \\ 0.06 & 0.00 \\ 0.04 & 0.00 \\ 0.04 & 0.00 \\ 0.06 & 0.00 \\ 0.06 & 0.00 \\ 0.06 & 0.00 \\ 0.00 & 0.32 \\ 0.00 & 0.32 \\ 0.00 & 0.32 \\ 0.00 & 0.47 \\ 0.00 & 0.47 \\ 0.00 & 0.32 \\ 0.00 & 0.32 \\ 0.02 & 0.00 \\ 0.02 & 0.00 \\ 0.24 & 0.00 \\ 0.02 & 0.00 \\ 0.00 & 0.16 \\ 0.00 & 0.16 \\ 0.44 & 0.00 \\ 0.22 & 0.00 \\ 0.22 & 0.00 \\ 0.22 & 0.00 \\ 0.22 & 0.00 \\ 0.00 & 0.00 \\ 0.22 & 0.00 \\ 0.29 & 0.00 \end{pmatrix}$$

$$\Sigma' = \begin{pmatrix} 4.11 & 0.00 \\ 0.00 & 2.83 \end{pmatrix} \qquad V' = \begin{pmatrix} 0.25 & 0.17 & 0.27 & 0.00 & 0.07 & 0.00 & 0.91 \\ 0.00 & 0.00 & 0.00 & 0.89 & 0.00 & 0.45 & 0.00 \end{pmatrix}$$

FIG. 11

$$\underbrace{\begin{pmatrix} 0.61 & 0.47 \end{pmatrix}}_{Q} = \underbrace{\begin{pmatrix} 1 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 1 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \end{pmatrix}^T}_{q^T} \underbrace{\begin{pmatrix} 0.61 & 0.00 \\ 0.06 & 0.00 \\ 0.06 & 0.00 \\ 0.06 & 0.00 \\ 0.06 & 0.00 \\ 0.06 & 0.00 \\ 0.06 & 0.00 \\ 0.06 & 0.00 \\ 0.04 & 0.00 \\ 0.04 & 0.00 \\ 0.06 & 0.00 \\ 0.06 & 0.00 \\ 0.06 & 0.00 \\ 0.00 & 0.32 \\ 0.00 & 0.32 \\ 0.00 & 0.32 \\ 0.00 & 0.47 \\ 0.00 & 0.47 \\ 0.00 & 0.32 \\ 0.00 & 0.32 \\ 0.02 & 0.00 \\ 0.02 & 0.00 \\ 0.24 & 0.00 \\ 0.02 & 0.00 \\ 0.00 & 0.16 \\ 0.00 & 0.16 \\ 0.44 & 0.00 \\ 0.22 & 0.00 \\ 0.22 & 0.00 \\ 0.22 & 0.00 \\ 0.22 & 0.00 \\ 0.00 & 0.00 \\ 0.22 & 0.00 \\ 0.29 & 0.00 \end{pmatrix}}_{U'}$$

FIG. 12

$$\begin{pmatrix} 2.03 & 0.00 \\ 0.00 & 1.69 \end{pmatrix}$$

Scale Matrix

FIG. 13

$$\begin{bmatrix} 1.24 & 0.79 \end{bmatrix} = \begin{bmatrix} 0.61 & 0.47 \end{bmatrix} \begin{pmatrix} 2.03 & 0.00 \\ 0.00 & 1.69 \end{pmatrix}$$

$Q_{scale}$          $Q$          Scale Matrix

FIG. 14

$$
\begin{array}{c}
\text{D1} \\
\text{D2} \\
\text{D3} \\
\text{D4} \\
\text{D5} \\
\text{D6} \\
\text{D7}
\end{array}
\begin{pmatrix}
0.51 & 0.00 \\
0.35 & 0.00 \\
0.55 & 0.00 \\
0.00 & 1.50 \\
0.14 & 0.00 \\
0.00 & 0.76 \\
1.85 & 0.00
\end{pmatrix}
=
\begin{pmatrix}
0.51 & 0.00 \\
0.35 & 0.00 \\
0.55 & 0.00 \\
0.00 & 1.50 \\
0.14 & 0.00 \\
0.00 & 0.76 \\
1.85 & 0.00
\end{pmatrix}
\begin{pmatrix}
2.03 & 0.00 \\
0.00 & 1.69
\end{pmatrix}
$$

$V_{scale}$        $V'$        Scale Matrix

CONTROL COMPUTER AND FILE SEARCH METHOD USING THE SAME

BACKGROUND

1. Technical Field

Embodiments of the present disclosure relate to information search technology, and more particularly to a control computer and a file search method using the control computer.

2. Description of Related Art

In an internet search query expression is cast too narrowly, some useful information may be missed and overlooked, while on the other hand, if the search query expression is cast too widely, some useful information may be buried deep inside the search results and obscured by more useless information. For example, a user may need to search for information about cloud computing, but he/she is not familiar with the cloud computing technology. If the search expression is set as "cloud and computing", the search results would be narrower than expected because such terms as "hadoop", "Map/Reduce", "hbase", and "zookeeper", which are also relevant with the cloud computing technology, are missing. However, if the search expression is set as "cloud", then the search results will be too varied and more pertinent information actually relating to cloud computing technology would be lost among the more general results.

Furthermore, in the current internet search technologies such as GOOGLE, rankings of the search results are based on the perceived "importance" of web pages through the analysis of the hyper-linked relationships between pages. With this technology, the ranking rules are predefined by the system and user-specified interests have no impact on the ranking of the results. In other words, the query by the user is not being customized, and a more efficient method for performing file search is therefore desirable.

BRIEF DESCRIPTION OF THE DRAWINGS

FIG. 5 is a schematic diagram of one embodiment of a plurality of documents representing search results.

FIG. 6 is a schematic diagram of one embodiment of a term-document matrix created by the documents in FIG. 5.

FIG. 7 is a schematic diagram of one embodiment of a term vector matrix extracted from the term-document matrix in FIG. 6.

FIG. 8 is a schematic diagram of one embodiment of a diagonal matrix extracted from the term-document matrix in FIG. 6.

FIG. 9 is a schematic diagram of one embodiment of a document vector matrix extracted from the term-document matrix in FIG. 6.

FIG. 11 are schematic diagrams of one embodiment of a reduced term vector matrix, a reduced diagonal matrix, and a reduced document vector matrix after performing the dimension reduction operation in FIG. 10.

FIG. 12 is a schematic diagram of one embodiment of mapping an updated query expression into the k-dimension term space to obtain a vector of the updated query expression.

FIG. 13 is a schematic diagram of one embodiment of a scale matrix.

FIG. 14 is a schematic diagram of one embodiment of an operation to perform a scale processing on the vector of the updated query expression based on the scale matrix.

FIG. 15 is a schematic diagram of one embodiment of the operation to perform the scale processing on the reduced document vector matrix, based on the scale matrix.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
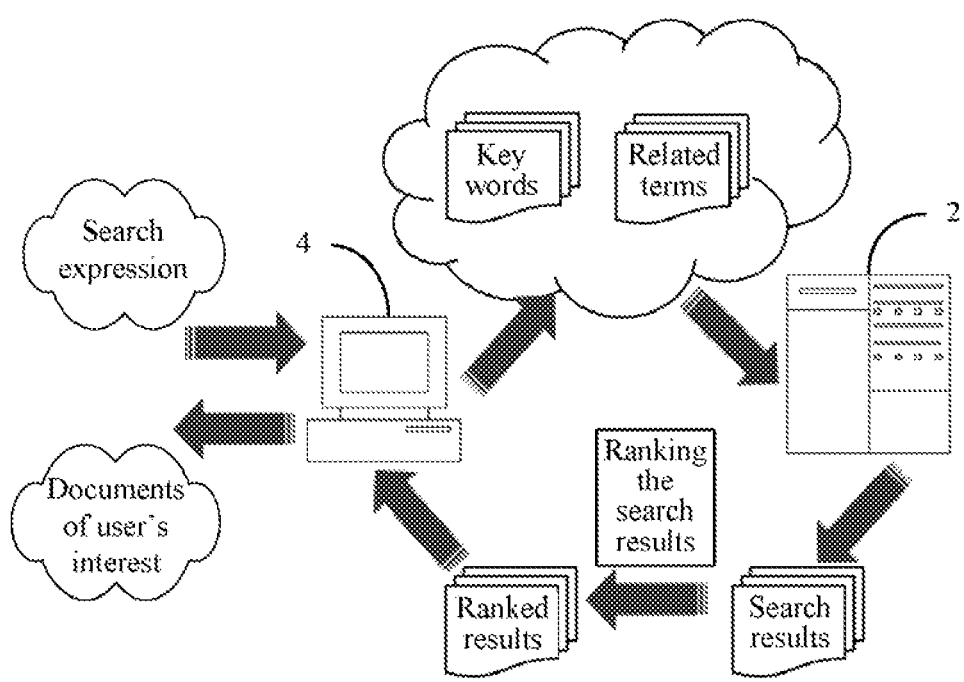
FIG. 1 is a schematic diagram of one embodiment of a control computer in communication with a plurality of client computers through a network.

FIG. 1 is a schematic diagram of one embodiment of a control computer 2 in communication with a plurality of client computers 4 through a network. For simplification, only one client computer 4 is shown as an example in FIG. 1. The network may be the Internet, an intranet, or any other relevant network.

In one embodiment, the control computer 2 is used to receive a search expression sent from the client computer 4, obtain a plurality of keywords and related terms of the keywords based on the search expression, and perform a search operation according to the keywords and the related terms to obtain search results from a data source. The control computer 2 ranks the search results according to interest of a user, and sends the plurality of documents in the ranked results to the client computer 4. In one embodiment, the data source may be the Internet, or at least one database, or at least one file system.

Figure 2:
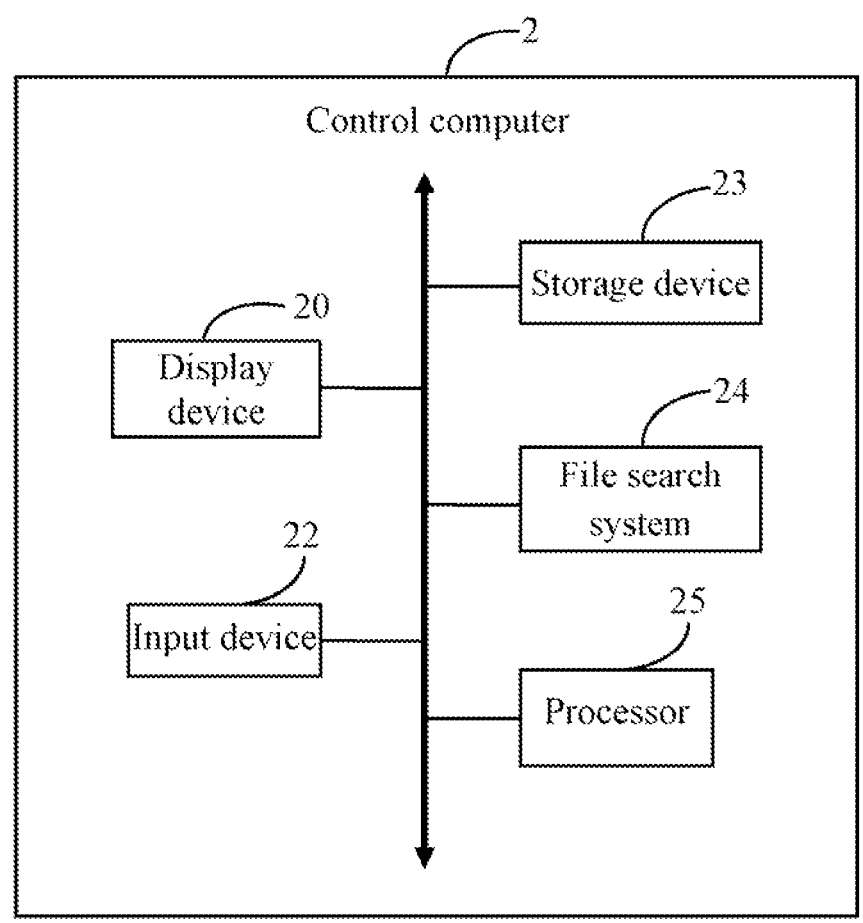
FIG. 2 is a block diagram of one embodiment of the control computer.

FIG. 2 is a block diagram of one embodiment of the control computer 2. In one embodiment, the control computer 2 includes a display device 20, an input device 22, a storage device 23, a file search system 24, and at least one processor 25. The file search system 24 may be used to rank the search results according to interest of the user. A detailed description will be given in the following paragraphs.

The display device 20 is a monitor/display that may be used to display the search results, and the input device 22 may be a mouse or a keyboard used to input computer readable data. The storage device 23 is a device that stores computer-readable data, and depending on the embodiment, may comprise a hard disk drive, flash memory, or other storage mediums. In one embodiment, the storage device 23 stores a keyword dictionary and a related term dictionary. The keyword dictionary stores a plurality of keywords that are used frequently, the keywords are also called "core terms." The related term dictionary stores a plurality of terms related to each of the keywords. For example, the related terms of the keyword "video" may include "video type," "video encoding," "video storage," "video storage type," and "video data storage".

Figure 3:
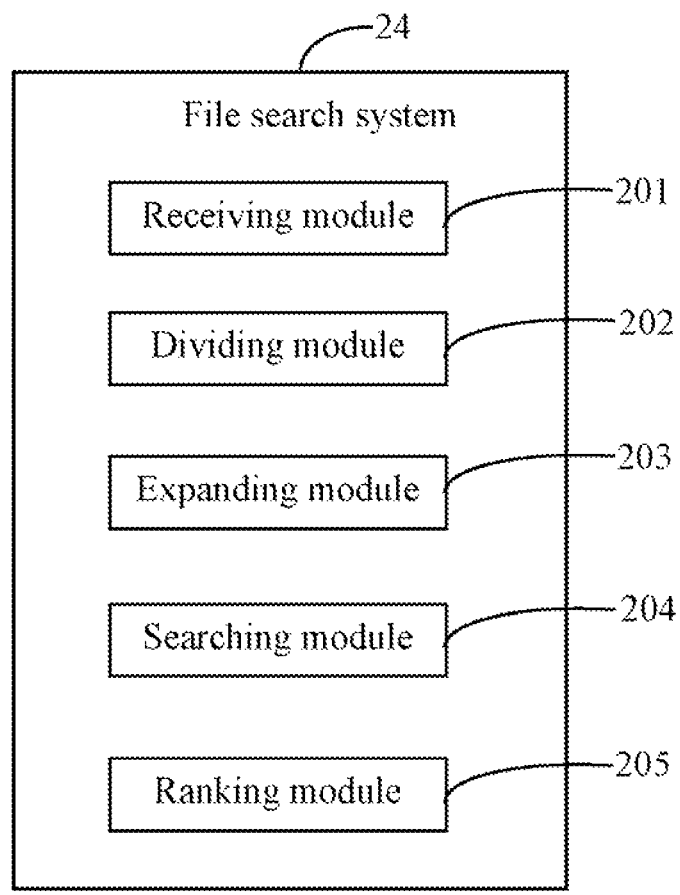
FIG. 3 is a block diagram of one embodiment of a file search system in a control computer.

FIG. 3 is a block diagram of one embodiment of the file search system 24 in the control computer 2. In one embodiment, the file search system 24 may include one or more modules, for example, a receiving module 201, a dividing module 202, an expanding module 203, a searching module 204, and a ranking module 205. The one or more modules 201-205 may comprise computerized code in the form of one or more programs that are stored in the storage device 23, or other storage systems such as memory. The computerized code includes instructions that are executed by the at least one processor 25 to provide functions for the one or more modules 201-205.

Figure 4:
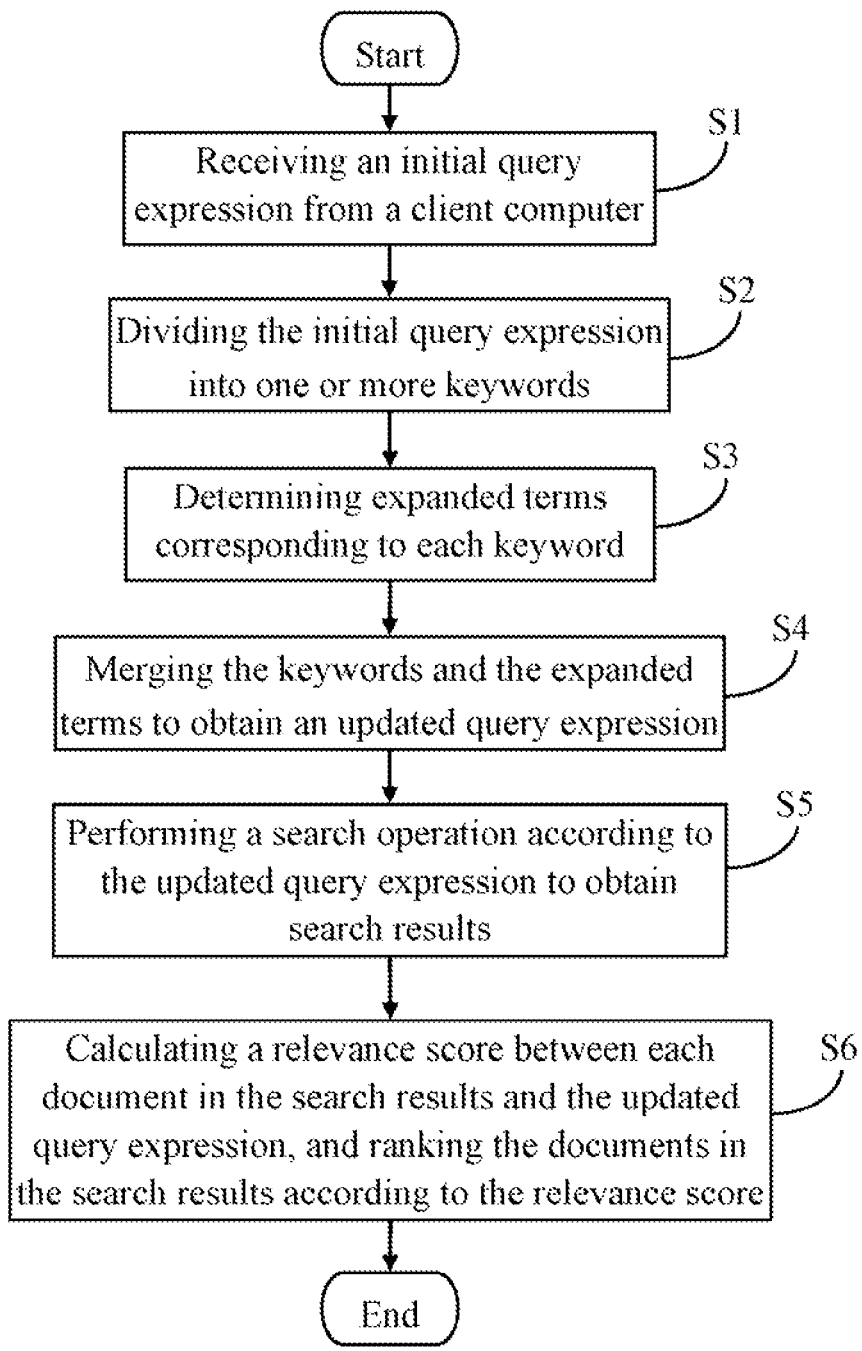
FIG. 4 is a flowchart of one embodiment of a method for performing file searches using the control computer.

FIG. 4 is a flowchart of one embodiment of a method for performing file searches using the control computer 2. Depending on the embodiment, additional blocks may be added, others removed, and the ordering of the blocks may be changed.

In block S1, the receiving module 201 receives an initial query expression from the client computer 4. In one embodiment, the initial query expression may be a sentence, a phrase, or other suitable word(s).

In block S2, the dividing module 202 divides the initial query expression into one or more keywords. A detailed description of a dividing operation is given as follows. The dividing module 202 compares the initial query expression with a plurality of related terms in the related term dictionary using a longest-term match rule, so as to obtain one or more matched terms, and the matched terms represent the one or more keywords. A first arithmetical statement of block S2 refers to the following exemplary code.

```
SearchWords = {W₁, W₂, ...Wₙ}
RW₁ = {RT₁, RT₂, ... RTₘ}: Related Term Set of W₁ from the
Related Term
Dictionary that contain the word W₁
CoreTerm = null: CoreTerm Set
While(n > 0){
    Term = FindTerm(SearchWords);
    If(Term != null)
    {
        Search words = SearchWords – Term;
        n = n – lengthof(Term);
        CoreTerm.add(Term);
    }
}
FindTerm( ){
    i = 2;
    Term1 = W₁;
    Term2 = Term1 + W₁;
    Boolean b = false;
    While(i < n){
        For(int j = 0; j < m; j++){
            If(RWⱼ contain Term2){
                i++;
                Term1 = Term2;
                Term2+ = W₁;
                b = true;
                Break;
            }
        }
        If(b = = false){
            If(term1 = = W₁) { return null;}
            else { Return Term1;}
        }
    }
}
```

For example, suppose that an initial query expression "q1" is "video storage type communication device". At step 1, the dividing module 202 reads the first term "video" of the initial query expression "q1". If the related terms of the first term "video" are as follows: {video type, video encoding, video storage, video storage type, video data storage}, the longest matched term of the first term "video" is determined as "video storage type" using the longest-term match rule. The dividing module 202 adds the matched term "video storage type" to a set of the keywords of the initial query expression "q1". Then, the remaining or residual portion (residual part) of the initial query expression "q1" is "communication device".

At step 2, the dividing module 202 reads the next term "communication" in the residual part of the initial query expression "q1". If the related terms of the next term "communication" are as follows: {communication system, communication network, communication device}, the longest matched term of the term "communication" is determined as "communication device" using the longest-term match rule. The dividing module 202 adds the matched term "communication device" to the set of the keywords of the initial query expression "q1," and then the dividing operation ends. Thus, the keywords of the initial query expression are as follows: {"video storage type," and "communication device"}.

If the matched term is not found in the related term dictionary (i.e., CoreTerm=null), the dividing module 202 compares the initial query expression with a plurality of keywords in the keyword dictionary using the longest-term match rule, to obtain one or more matched terms, the matched terms representing the one or more keywords. It is to be understood that, the match method in the keyword dictionary is similar to the match method in the related term dictionary (refer to paragraphs [0027]-[0029]).

In one embodiment, if the word sequence of the initial query expression is different, the keywords divided from the initial query expression may be different. For example, if the sequence of an initial query expression "q2" is "java system," the keywords divided from the initial query expression "q2" is "java system," but if the sequence of the initial query expression "q2" is changed to "system java," the keywords of the initial query expression are "system" and "java".

In block S3, the expanding module 203 determines expanded terms corresponding to each keyword of the initial query expression. In one embodiment, the expanded terms are words or phrases that related to the keywords. A second arithmetical statement of block S3 refers to the following exemplary code.

```
SearchWords = {W₁, W₂, ...Wₙ}
RW₁ = {RT₁, RT₂, ...RTₘ}: Related Term Set of W₁ from the Related
Term
                Dictionary that contain the word W₁
RelatedConcept = null: Related Concept Set
for(i = 0; i < n; i++)
{
    for(each words in SearchWords)
    {
        for(each RTⱼ in RW₁)
        {
            RelatedTerm = SearchWords.Replace(W₁, RTⱼ);
            Add RelatedTerm to RelatedConcept;
        }
    }
};
```

For example, suppose that the keywords "k1" are "video storage type". At step 1, the expanding module 203 reads the first term "video" of the keywords "k1". If the related terms of the first term "video" are as follows: {digital storage media, stream of video, digital video}, then the expanding module 203 adds "digital storage media storage type," "stream of video storage type," and "digital video storage type" to a set of the expanded terms of the keywords "k1".

At step 2, the expanding module 203 reads the second term "storage" of the keywords "k1". If the related terms of the second term "storage" are as follows: {cache, storage medium, memory device}, then the expanding module 203 adds "video cache type," "video storage medium type," and "video memory device type" to the set of the expanded terms of the keywords "k1".

At step 3, the expanding module 203 reads the third term "type" of the keywords "k1". If the related terms of the third term "type" are as follows: {cutting tip}, then the expanding module 203 adds "video storage cutting tip" to the set of the expanded terms of the keywords "k1". Thus, the set of the expanded terms of the keywords "k1" are as follows.

{"digital storage media storage type";
"stream of video storage type";
"digital video storage type";
"video cache type";
"video storage medium type";
"video memory device type";
"video storage cutting tip"}

In block S4, the searching module 204 merges the keywords and the expanded terms to render an updated query expression. For example, suppose that the keywords "k1" are "video storage type," the expanded terms of the keywords "k1" are as mentioned above. Thus, the updated query expression of the keywords "k1" are as follows.

{"video storage type";
"digital storage media storage type";
"stream of video storage type";
"digital video storage type";
"video cache type";
"video storage medium type";
"video memory device type";
"video storage cutting tip"}

In block S5, the searching module 204 performs a search operation according to the updated query expression, and obtains search results from the data source. The search results may include a plurality of documents which are relevant to the updated query expression. Summary records of the documents will be displayed on the display device 20 with a plurality of hyper-links to websites. As mentioned above, if the word sequence of the initial query expression is different, the keywords extracted from the initial query expression may be different. Thus, a sequence of the updated query expression merged from the keywords and the expanded terms may also be different. That is to say, the updated query expression represents the user's interest, that is, the documents which the user most expects to view. By means of the updated query expression, all or part of the documents in the search results will be processed and re-ordered.

In block S6, the ranking module 205 calculates a relevance score between each document in the search results and the updated query expression, ranks the documents in the search results according to the relevance score, and displays the documents with a ranking order on the display device 20. In one embodiment, the relevance score is a cosine value of an angle between a vector of each document in the search results and a vector of the updated query expression. The less divergence, or the smaller the angle between the two vectors, the larger the cosine value of the angle is, and the larger the relevance score of the two vectors.

In one embodiment, the larger the value of the relevance score, the more relevant the ranking content is to the document, that is, the document is, or is closer to, what the user most expects to view or access. In one embodiment, the ranking module 205 may rank the documents in the search results in descending order according to the cosine values of the angles, or the ranking may be in an ascending order of the angles.

A particular example will be described herein to better explain block S6. Assume that the documents in the search results consist of the titles of 7 books (this refers to D1 to D7 of FIG. 5). The ranking module 205 removes one or more stop words from the documents in the search results, and obtains a term-document matrix "A" as shown in FIG. 6. The stop words at least include articles, adverbs, and quantifiers, such as "a", and "the" and "this". FIG. 6 is a 34×7 term-document matrix, which is referred to as A. The rows represent the terms, and the columns represent the documents. The elements of the matrix are the number of occurrences of each term in a particular document.

The ranking module 205 decomposes the term-document matrix "A" into a product form of three matrices using a singular value decomposition (SVD) algorithm, that is, $A=U_{m\times r}\Sigma_{r\times r}V^T_{r\times n}$. The three matrices include a term vector matrix which is referred to as "U" (refer to FIG. 7), a diagonal matrix which is referred to as "$\Sigma$" (refer to FIG. 8), and a document vector matrix which is referred to as "V" (refer to FIG. 9). As shown in FIG. 7, each column in the term vector matrix "U" represents a term vector. As shown in FIG. 8, "$\Sigma$" is the diagonal matrix of the singular values. As shown in FIG. 9, each column in the document vector matrix "V" represents a document vector.

Figure 10:
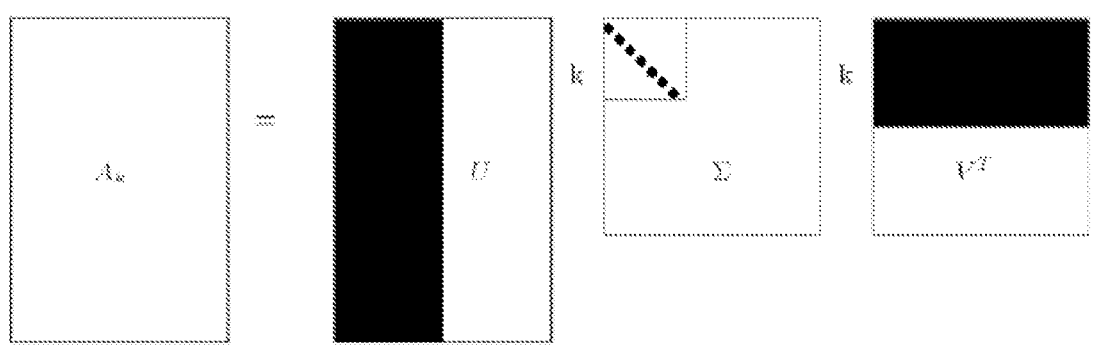
FIG. 10 is a schematic diagram of one embodiment of an operation to carry out a dimension reduction on the three matrices in FIGS. 7-9, to obtain a k-dimension term space.

The ranking module 205 performs a dimension reduction operation on the three matrices to obtain a k-dimension term space (refer to FIG. 10). After performing the dimension reduction operation, a higher-dimension (e.g., r-dimension) term space is reduced to a lower-dimension (e.g., k-dimension) term space. For illustration purposes, the value of 2 is selected for "k", which means that the original term space is reduced to a two-dimensional term space.

The ranking module 205 obtains a reduced term vector matrix which is referred to as "U'", a reduced diagonal matrix which is referred to as "σ'", and a reduced document vector matrix which is referred to as "V'" (refer to FIG. 11).

Assume that an updated query expression "q3" is {"network" and "cloud"}; the ranking module 205 maps the updated query expression "q3" into the k-dimension term space to obtain a vector "Q" of the updated query expression, according to the mapping formula $Q=q^TU'$ (refers to FIG. 12).

The ranking module 205 extracts a square root of each element in the reduced diagonal matrix "$\Sigma$'" to obtain a scale matrix (refer to FIG. 13).

The ranking module 205 multiplies the vector "Q" of the updated query expression and the reduced document vector matrix "V'" by the scale matrix (refer to FIG. 14 and FIG. 15), and obtains an updated vector "$Q_{scale}$" of the updated query expression and an updated document vector matrix "$V_{scale}$".

The ranking module 205 calculates an angle between each document vector in the updated document vector matrix "$V_{scale}$" and the updated vector "$Q_{scale}$" of the updated query expression, by calculating an inner product of the two vectors. As mentioned above, the smaller the angle, the more relevant the query expression is to the document, that is to say, the document is, or is closer to, what the user most expects to view or access.

The ranking module 205 ranks each document vector in the updated document vector matrix "$V_{scale}$" according to the ascending order of the values of the calculated angles, and maps the ranked document vectors to the corresponding documents in the search results to fix the ranked documents in the search results, that is, ranks the documents in the search results according to the ranking order of the document vector.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A file search method, the method comprising:
   receiving an initial query expression from a client computer;
   dividing the initial query expression into one or more keywords by comparing the initial query expression with a plurality of related terms in a related term dictionary using a longest-term match rule, and obtaining one or more matched terms, the matched terms representing the one or more keywords, the longest-term match rule being executed by obtaining a first term from the initial query expression, determining a first matched term by comparing the initial query expression with specified related terms of the first term, obtaining a residual part of the initial query expression by removing the first matched term from the initial query expression, obtaining a next term from the residual part of the initial query expression, determining a second matched term by comparing the residual part of the initial query expression with specified related terms of the next term, and repeating the longest-term match rule until the initial query expression is null;
   determining expanded terms corresponding to each of the keywords;
   merging the keywords and the expanded terms to obtain an updated query expression;
   performing a search operation according to the updated query expression, and obtaining search results from a data source, the search results comprising a plurality of documents matched with the updated query expression;
   calculating a relevance score between each document in the search results and the updated query expression, ranking the documents in the search results according to the relevance score, and displaying the documents with the ranking order on a display device of the client computer.

2. The method according to claim 1, wherein the data source is the Internet, at least one database, or at least one file system.

3. The method according to claim 1, wherein the step of dividing the initial query expression into one or more keywords further comprises:
   comparing the initial query expression with a plurality of keywords in a keyword dictionary using the longest-term match rule upon the condition that the matched term has not been found in the related term dictionary, and obtaining one or more matched terms, the matched terms representing the one or more keywords.

4. The method according to claim 1, wherein the relevance score is a cosine value of an angle between a vector of each document in the search results and a vector of the updated query expression.

5. The method according to claim 1, wherein the step of calculating a relevance score between each document in the search results and the updated query expression, ranking the documents in the search results according to the relevance score comprises:
   removing one or more stop words from the documents in the search results, and obtaining a term-document matrix;
   decomposing the term-document matrix into a product form of three matrices using a singular value decomposition algorithm, the three matrices comprising a term vector matrix, a diagonal matrix, and a document vector matrix;
   performing a dimension reduction operation on the three matrices to obtain a k-dimension term space, and generating a reduced term vector matrix, a reduced diagonal matrix, and a reduced document vector matrix;
   mapping the updated query expression into the k-dimension term space to obtain a vector of the updated query expression;
   extracting a square root of each element in the reduced diagonal matrix to obtain a scale matrix;
   multiplying the vector of the updated query expression and the reduced document vector matrix by the scale matrix, and obtaining an updated vector of the updated query expression and an updated document vector matrix;
   calculating an angle between each document vector in the updated document vector matrix and the updated vector of the updated query expression using an inner product of vectors; and
   ranking each document vector in the updated document vector matrix according to an ascending order of values of the calculated angles, and mapping the ranked document vectors to corresponding documents in the search results to obtain the ranked documents in the search results.

6. The method according to claim 5, wherein a value of k is selected as 2.

7. A control computer, comprising:
   a storage device;
   at least one processor; and
   one or more modules that are stored in the storage device and are executed by the at least one processor, the one or more modules comprising instructions:
   to receive an initial query expression from a client computer;
   to divide the initial query expression into one or more keywords by comparing the initial query expression with a plurality of related terms in a related term dictionary using a longest-term match rule, and obtaining one or more matched terms, the matched terms representing the one or more keywords, the longest-term match rule being executed by obtaining a first term from the initial query expression, determining a first matched term by comparing the initial query expression with specified related terms of the first term, obtaining a residual part of the initial query expression by removing the first matched term from the initial query expression, obtaining a next term from the residual part of the initial query expression, determining a second matched term by comparing the residual part of the initial query expression with specified related terms of the next term, and repeating the longest-term match rule until the initial query expression is null;
   to determine expanded terms corresponding to each keywords;

to merge the keywords and the expanded terms to obtain an updated query expression;

to perform a search operation according to the updated query expression, and obtain search results from a data source, the search results comprising a plurality of documents matched with the updated query expression;

to calculate a relevance score between each document in the search results and the updated query expression, rank the documents in the search results according to the relevance score, and display the documents with the ranking order on a display device of the client computer.

8. The control computer according to claim 7, wherein the data source is the Internet, at least one databases, or at least one file system.

9. The control computer according to claim 7, wherein the instruction of dividing the initial query expression into one or more keywords further comprises:

comparing the initial query expression with a plurality of keywords in a keyword dictionary using the longest-term match rule upon the condition that the matched term has not been found in the related term dictionary, and obtaining one or more matched terms, the matched terms representing the one or more keywords.

10. The control computer according to claim 7, wherein the relevance score is a cosine value of an angle between a vector of each document in the search results and a vector of the updated query expression.

11. The control computer according to claim 7, wherein the instruction of calculating a relevance score between each document in the search results and the updated query expression, ranking the documents in the search results according to the relevance score comprises:

removing one or more stop words from the documents in the search results, and obtaining a term-document matrix;

decomposing the term-document matrix into a product form of three matrices using a singular value decomposition algorithm, the three matrices comprising a term vector matrix, a diagonal matrix, and a document vector matrix;

performing a dimension reduction operation on the three matrices to obtain a k-dimension term space, and generating a reduced term vector matrix, a reduced diagonal matrix, and a reduced document vector matrix;

mapping the updated query expression into the k-dimension term space to obtain a vector of the updated query expression;

extracting a square root of each element in the reduced diagonal matrix to obtain a scale matrix;

multiplying the vector of the updated query expression and the reduced document vector matrix by the scale matrix, and obtaining an updated vector of the updated query expression and an updated document vector matrix;

calculating an angle between each document vector in the updated document vector matrix and the updated vector of the updated query expression using an inner product of vectors; and ranking each document vector in the updated document vector matrix according to an ascending order of values of the calculated angles, and mapping the ranked document vectors to corresponding documents in the search results to obtain the ranked documents in the search results.

12. The control computer according to claim 11, wherein a value of k is selected as 2.

13. A non-transitory storage medium having stored thereon instructions that, when executed by a processor of a control computer, causes the processor to perform a file search method, the method comprising:

receiving an initial query expression from a client computer;

dividing the initial query expression into one or more keywords by comparing the initial query expression with a plurality of related terms in a related term dictionary using a longest-term match rule, and obtaining one or more matched terms, the matched terms representing the one or more keywords, the longest-term match rule being executed by obtaining a first term from the initial query expression, determining a first matched term by comparing the initial query expression with specified related terms of the first term, obtaining a residual part of the initial query expression by removing the first matched term from the initial query expression, obtaining a next term from the residual part of the initial query expression, determining a second matched term by comparing the residual part of the initial query expression with specified related terms of the next term, and repeating the longest-term match rule until the initial query expression is null;

determining expanded terms corresponding to each keywords;

merging the keywords and the expanded terms to obtain an updated query expression;

performing a search operation according to the updated query expression, and obtaining search results from a data source, the search results comprising a plurality of documents matched with the updated query expression;

calculating a relevance score between each document in the search results and the updated query expression, ranking the documents in the search results according to the relevance score, and displaying the documents with the ranking order on a display device of the client computer.

14. The non-transitory storage medium according to claim 13, wherein the data source is the Internet, at least one databases, or at least one file system.

15. The non-transitory storage medium according to claim 13, wherein the step of dividing the initial query expression into one or more keywords further comprises:

comparing the initial query expression with a plurality of keywords in a keyword dictionary using the longest-term match rule upon the condition that the matched term has not been found in the related term dictionary, and obtaining one or more matched terms, the matched terms representing the one or more keywords.

16. The non-transitory storage medium according to claim 13, wherein the relevance score is a cosine value of an angle between a vector of each document in the search results and a vector of the updated query expression.

17. The non-transitory storage medium according to claim 13, wherein the step of calculating a relevance score between each document in the search results and the updated query expression, ranking the documents in the search results according to the relevance score comprises:

removing one or more stop words from the documents in the search results, and obtaining a term-document matrix;

decomposing the term-document matrix into a product form of three matrices using a singular value decomposition algorithm, the three matrices comprising a term vector matrix, a diagonal matrix, and a document vector matrix;

performing a dimension reduction operation on the three matrices to obtain a k-dimension term space, and generating a reduced term vector matrix, a reduced diagonal matrix, and a reduced document vector matrix;

mapping the updated query expression into the k-dimension term space to obtain a vector of the updated query expression;

extracting a square root of each element in the reduced diagonal matrix to obtain a scale matrix;

multiplying the vector of the updated query expression and the reduced document vector matrix by the scale matrix, and obtaining an updated vector of the updated query expression and an updated document vector matrix;

calculating an angle between each document vector in the updated document vector matrix and the updated vector of the updated query expression using an inner product of vectors; and ranking each document vector in the updated document vector matrix according to an ascending order of values of the calculated angles, and mapping the ranked document vectors to corresponding documents in the search results to obtain the ranked documents in the search results.

18. The non-transitory storage medium according to claim 17, wherein a value of k is selected as 2.

19. The non-transitory storage medium according to claim 13, wherein the medium is selected from the group consisting of a hard disk drive, a compact disc, a digital video disc, and a tape drive.

* * * * *